United States Patent
Neuberth et al.

(10) Patent No.: US 9,518,624 B2
(45) Date of Patent: Dec. 13, 2016

(54) METHOD FOR REDUCING CHATTER VIBRATIONS OF A FRICTION CLUTCH IN A DRIVETRAIN OF A MOTOR VEHICLE

(71) Applicant: Schaeffler Technologies AG & Co. KG, Herzogenaurach (DE)

(72) Inventors: Ulrich Neuberth, Oetigheim (DE); Michael Reuschel, Ottersweier (DE)

(73) Assignee: Schaeffler Technologies AG & Co. KG, Herzogenaruach (DE)

( * ) Notice: Subject to any disclaimer, the term of this patent is extended or adjusted under 35 U.S.C. 154(b) by 0 days.

(21) Appl. No.: 14/783,271

(22) PCT Filed: Apr. 1, 2014

(86) PCT No.: PCT/DE2014/200153
§ 371 (c)(1),
(2) Date: Oct. 8, 2015

(87) PCT Pub. No.: WO2014/166490
PCT Pub. Date: Oct. 16, 2014

(65) Prior Publication Data
US 2016/0047428 A1     Feb. 18, 2016

(30) Foreign Application Priority Data

Apr. 11, 2013   (DE) .......................... 10 2013 206 446
Jul. 26, 2013   (DE) .......................... 10 2013 214 669

(51) Int. Cl.
F16B 13/00       (2006.01)
F16D 48/06       (2006.01)
(Continued)

(52) U.S. Cl.
CPC ............... *F16D 48/06* (2013.01); *B60K 6/387* (2013.01); *G05D 17/02* (2013.01);
(Continued)

(58) Field of Classification Search
None
See application file for complete search history.

(56) References Cited

U.S. PATENT DOCUMENTS 5,620,390 A * 4/1997 Kono ................... F16H 61/143
                                                  192/3.31
8,000,869 B2 * 8/2011 Petzold ................. F16D 48/066
                                                  477/166
(Continued)

FOREIGN PATENT DOCUMENTS

DE    102012217132    4/2013
DE    102013204698    10/2013

*Primary Examiner* — Jonathan M Dager
(74) *Attorney, Agent, or Firm* — Simpson & Simpson, PLLC

(57) ABSTRACT

A method for reducing chatter vibrations of a friction clutch controlled automatically by a clutch actuator on the basis of a target clutch torque assigned to a clutch torque which is to be transmitted. The clutch has a present actual clutch torque which is marked by vibrations as a result of chatter vibrations which occur occasionally. In order to achieve a reduction of the chatter vibrations, from an input signal that is representative of the clutch torque that is marked by vibrations, on the basis of a vibration-selective guidance variable derived in a torque pattern between internal combustion engine and friction clutch, an absolute amplitude and a phase of the input signal are ascertained on the basis of a transfer function which maps the guidance variable on a vibration-selective clutch torque; from that a correction clutch torque is determined; and using that the target clutch torque is corrected.

10 Claims, 1 Drawing Sheet

(51) Int. Cl.
*G05D 17/02* (2006.01)
*B60K 6/387* (2007.10)

(52) U.S. Cl.
CPC ........... *F16D 2500/3027* (2013.01); *F16D 2500/3067* (2013.01); *F16D 2500/30814* (2013.01); *F16D 2500/3109* (2013.01); *F16D 2500/50293* (2013.01); *F16D 2500/70252* (2013.01); *F16D 2500/70408* (2013.01); *F16D 2500/70605* (2013.01); *F16D 2500/70615* (2013.01); *F16D 2500/70621* (2013.01); *F16D 2500/70626* (2013.01); *F16D 2500/70663* (2013.01); *Y10S 903/902* (2013.01)

(56) References Cited

U.S. PATENT DOCUMENTS

| | | | | |
|---|---|---|---|---|
| 8,818,666 B2* | 8/2014 | Chae | .................. | F16H 61/04 |
| | | | | 701/67 |
| 8,882,636 B2* | 11/2014 | Pietron | .................. | B60W 10/02 |
| | | | | 477/176 |
| 9,152,608 B2* | 10/2015 | Lerede | .................. | B60W 40/12 |
| 9,250,157 B2* | 2/2016 | Felber | .................. | F02D 41/1498 |
| 2003/0150683 A1* | 8/2003 | Hoshiya | .................. | F16D 48/066 |
| | | | | 192/3.57 |
| 2004/0140174 A1* | 7/2004 | Kano | .................. | B60K 28/165 |
| | | | | 192/104 R |
| 2004/0186645 A1* | 9/2004 | Kohno | .................. | B60T 1/062 |
| | | | | 701/51 |
| 2004/0260444 A1* | 12/2004 | Winkelmann | .......... | F16D 48/06 |
| | | | | 701/67 |
| 2005/0189192 A1* | 9/2005 | Serebrennikov | ...... | B60W 30/20 |
| | | | | 192/30 V |
| 2006/0009900 A1* | 1/2006 | Gerhart | .................. | F16D 48/066 |
| | | | | 701/67 |
| 2007/0042916 A1* | 2/2007 | Iyer | .................. | C10M 141/10 |
| | | | | 508/110 |
| 2009/0158866 A1* | 6/2009 | Kurrle | .................. | F16D 48/02 |
| | | | | 74/2 |
| 2010/0185373 A1* | 7/2010 | Herter | .................. | B60W 30/20 |
| | | | | 701/67 |
| 2010/0286858 A1* | 11/2010 | Otokawa | .................. | B60K 6/365 |
| | | | | 701/22 |
| 2013/0332039 A1* | 12/2013 | Lochocki | .............. | B60W 30/20 |
| | | | | 701/60 |
| 2014/0303863 A1* | 10/2014 | Kurata | .................. | F16D 48/06 |
| | | | | 701/67 |
| 2015/0060230 A1* | 3/2015 | Neuberth | .................. | F16D 48/06 |
| | | | | 192/30 V |

\* cited by examiner

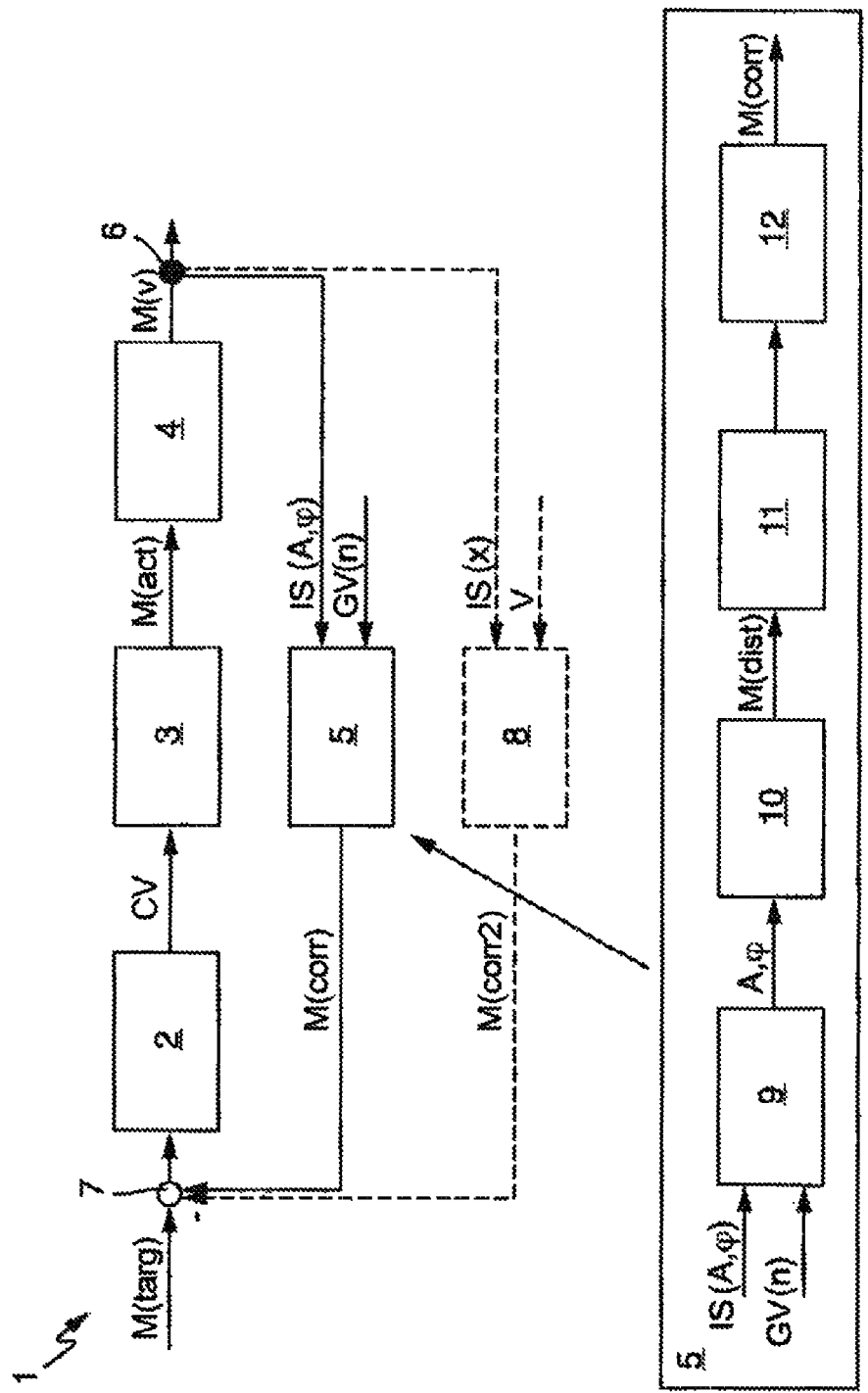

METHOD FOR REDUCING CHATTER VIBRATIONS OF A FRICTION CLUTCH IN A DRIVETRAIN OF A MOTOR VEHICLE

CROSS-REFERENCE TO RELATED APPLICATIONS

The present application is the U.S. national stage application pursuant to 35 U.S.C. §371 of International Application No. PCT/DE2014/200153, filed Apr. 1, 2014, which application claims priority of German Application No. 10 2013 206 446.2, filed Apr. 11, 2013 and German Application No. 10 2013 214 669.8, filed Jul. 26, 2013.

TECHNICAL FIELD

The disclosure relates to a method for reducing chatter vibrations of a friction clutch controlled automatically by a clutch actuator on the basis of a target clutch torque assigned to a clutch torque which is to be transmitted, which clutch is positioned in a drivetrain of a motor vehicle between an internal combustion engine and a transmission, having a present actual clutch torque which is marked by vibrations as a result of chatter vibrations which occur occasionally.

BACKGROUND

Automated friction clutches in a drivetrain of a motor vehicle between an internal combustion engine and a transmission have long been known. Here, instead of the foot of a driver, a clutch actuator controlled by a clutch device moves an actuating element, for example a clutch lever, a diaphragm spring, a lever spring or the like, along an actuation path. Assigned to the actuation path is a torque characteristic curve which can be adapted, for example, to external conditions such as clutch temperature, the frictional properties of the clutch linings, operation time and the like, and which may be calibrated by means of a contact point on the actuation path. For example, depending on the operating situation of the friction clutch desired by the driver or resulting from a transmission controller, a target clutch torque or a value connected therewith is ascertained by a control unit and issued as a control variable to adjust an actuation path of the clutch actuator corresponding to the target clutch torque. Depending on the design of the clutch actuator, with electric drive of the clutch actuator this variable may be an electrical variable such as voltage, current or pulse width of a supply voltage, or a pressure, a volume flow or the like in the case of a hydraulically or pneumatically operated clutch actuator. The adjustment of the actuation path may be monitored or regulated by means of relative and/or absolute distance sensors.

In friction clutches of this sort, due to the geometric properties and manufacturing tolerances not corresponding to the ideal state, for example angle and axis offsets between the friction elements of the friction clutch resulting in uneven frictional engagement, so-called chatter vibrations may occur, in which case there is superimposed on the target clutch torque adjusted on the basis of the predetermined target clutch torque a disturbance clutch torque overlaid with a predetermined amplitude and frequency, which may result in disruptions of comfort of the motor vehicle and increased wear. To reduce such chatter vibrations, a method is known, for example from unpublished German patent application No. 10 2012 217 132.0, in which the frequency, amplitude and phase of a vibration superimposed on the transmission input signal is ascertained. In this method, depending on the frequency ascertained, an amplified and phase-shifted signal of the same frequency is generated and modulated as a control signal onto the target clutch torque, so as to eliminate oscillations of the transmission input signal. When multiple frequency components occur with comparable amplitude in the ascertained range, this compensation can result in behavior that is difficult to track. If, in addition, a phase jump occurs in the transmission input signal, frequency is difficult to determine; the same is true in the case of greatly changing amplitude or frequency, since modulations of amplitude, phase and frequency are interconnected.

In unpublished German patent application no. 10 2013 204 698.7, a method is disclosed for damping drivetrain vibrations in a general form by eliminating a resonant frequency. This method provides only a limited possibility of reducing the chatter vibrations due to geometry. It is true that known excitation frequencies can be varied by adjusting filter parameters so as to perform an optimization for this excitation, but other excitation frequencies can be intensified thereby; for example, a chattering caused by geometry in a different frequency may be promoted.

SUMMARY

The present disclosure includes a proposed method software strategy for reducing forced chatter vibrations of known frequency in a mechatronically triggered friction clutch. These are typically drivetrain vibrations which are induced by geometric flaws in the clutch system and are provoked, for example, by a rotation speed of the internal combustion engine, a transmission input or slip speed. A method is depicted for how to calculate a necessary actuation correction in the clutch actuation system from the analysis of the input signal that shows the comfort-relevant chatter vibration, for example transmission input speed or vehicle acceleration signal and other signals that correspond to the frequencies of the expected excitations, for example slip speed. The proposed method is suitable for additional processes that are marked by vibrations, so that instead of clutch-specific variables such as target clutch torque, present actual clutch torque, disturbance clutch torque, correction clutch torque, chatter vibration and the like, the general variables can be stated, for example target torque, present actual torque, disturbance torque, correction torque, vibration and the like, which apply correspondingly to the respective processes.

Furthermore, when it is used in a clutch control process, additional geometric excitations can be compensated for, for example engine imbalances and the like. If the clutch should be incapable of such compensations, for example with regard to its dynamic capabilities, in the case of a hybrid motor vehicle having an electric motor that can be switched on to augment the combustion engine, the correction torque could be provided alternatively or additionally by the electric motor, as long as the latter is situated in the drivetrain supporting the friction clutch. Moreover, vibrations that are not dependent solely on a chatter stimulus can be compensated for by the electric motor when the friction clutch catches.

The proposed method provides for a reduction of chatter vibrations of an automatically actuated friction clutch in a drivetrain of a motor vehicle, where the friction clutch is situated between a drive unit, such as an internal combustion engine, and a transmission having a transmission input shaft which is driven by the internal combustion engine when the friction clutch is engaged. In this connection, it may be provided that by means of an input signal which includes clutch torque fluctuations and on which a Fourier analysis is performed by means of a guidance frequency signal serving as a reference value, where a transfer function is used between the target clutch torque and the input signal. A preferred embodiment of the method contains the provision that the input signal is a transmission input speed signal or a vehicle acceleration signal, the input signal being characterized by vibration frequency, amplitude and phase. A preferred embodiment of the method contains the provision that the guidance frequency is the speed of rotation of the drive unit, for example the internal combustion engine.

An example embodiment of the method contains the provision that the amplitude and phase obtained from the Fourier analysis are returned to correct the target clutch torque by means of inverting the transfer function and reversing the algebraic sign and/or correcting the amplitude and phase, where the guidance frequency is drawn upon to obtain the phase-correct target clutch torque offset, and where the sum of the target clutch torque and the target clutch torque offset is drawn upon to reduce chatter vibrations instead of drawing upon the target clutch torque alone. An example embodiment of the invention contains the provision that the correction is made by means of an integral controller. In this way, unwanted chatter vibration, in particular geometric chatter, can be compensated for.

In detail, the proposed method relates to a reduction of chatter vibrations, in particular geometric chatter vibrations of a friction clutch forced by geometric aberration of the friction clutch. This is controlled automatically by a clutch actuator on the basis of a target clutch torque assigned to a clutch torque that is to be transmitted. The friction clutch is preferably situated in a drivetrain of a motor vehicle, between an internal combustion engine and a transmission. Present actual clutch torques marked by vibrations may occur occasionally in the friction clutch due to the geometry-based chatter vibrations. When this occurs, an absolute amplitude and a phase of the input signal are obtained from an input signal that is representative of the clutch torque marked by vibrations, on the basis of a vibration-selective guidance variable derived in a torque pattern between the internal combustion engine and the friction clutch. From these values, by means of a transfer function that maps the input signal on a vibration-selective clutch torque, a phase-selective disturbance clutch torque is determined; from that a phase-correct correction clutch torque is determined; and using that the target clutch torque is corrected. The input signal can be made up of or determined from a transmission input signal, for example a rotation parameter such as the rotation speed of a transmission input shaft and/or a vehicle acceleration signal. The guidance variable may be a rotation parameter, for example the speed of the internal combustion engine.

For example, a phase-selective amplitude can be obtained from the guidance variable. This phase-selective amplitude can serve as a reference value for obtaining a phase-selective amplitude of the input signal. One or both phase-selective amplitudes of the guidance variable and of the input signal can be obtained by means of a Fourier analysis.

Obtaining a correction clutch torque for phase-selective compensation of the obtained disturbance clutch torque can be accomplished by means of inverting the disturbance clutch torque. The correction of the target clutch torque can be accomplished in various ways, for example, regulated by means of a regulator and/or pre-controlled by means of a pre-control element. The correction may be made permanently or temporarily, for example with a time limit depending on a threshold. The target clutch torque may be corrected, for example by means of a P controller, using the correction clutch torque. Alternatively or in addition, an amplitude of the correction clutch torque may be corrected continuously by means of an I controller. A correction of a clutch torque marked by vibrations can be provided within specified amplitudes and/or phase shifts of the input signal, the disturbance clutch torque, the correction clutch torque and/or the guidance variable. Furthermore, a correction of the target clutch torque may be made temporally in the sense of a hysteresis.

In particular, in hybrid drivetrains having an electric motor supporting the internal combustion engine, the phase-selective disturbance clutch torque may be provided by means of a torque contributed by the electric motor, corresponding to the correction clutch torque.

The proposed method is further distinguished by the following beneficial features:

The method is especially suitable when geometric flaws in the clutch system having the friction clutch result in disturbance clutch torques, which are stable with regard to their amplitude for a relatively long time, i.e. for example within a characteristic readjusting time of the clutch actuator, and preferably have a stable phase relationship to the guidance variable.

In an example embodiment a variable frequency or a variable frequency window, in which disturbance clutch torques caused by geometric chattering occur, is specified, which result in a modulation of an input signal having that frequency.

A continuous determination is made of the amplitude and phase of a vibration component of the input signal in relation to this frequency.

The amplitude and phase of the input signal are conveyed to the disturbance clutch torque by means of the transfer function. By preference, the inverse of the disturbance torque is formed from the disturbance clutch torque, and is supplied to the target clutch torque as a compensation clutch torque.

A correction of the target clutch torque may be made by means of a defined component of the correction clutch torque, for example its amplitude. The component, for example 50%, may be fixed, regulated, or specified depending on other parameters.

Feedback of the correction clutch torque to the target clutch torque may occur by means of an I controller.

Multiple corrections (control components/regulators) may be provided simultaneously with differing guidance variables, in which case their results may be superimposed additively.

In addition, the proposed method may be utilized for already implemented vibration measures, in which case modulation torques obtained using various methods may be superimposed on each other.

In an example embodiment, the proposed method is implemented in a control unit for controlling the friction clutch.

The proposed method represents a robust method for reducing chatter vibrations.

In summary, upon the appearance of geometric chatter vibrations, i.e., those caused by design, the vibration frequency changes compared to the frequency of known excitation sources. If the excitation frequency intersects a natural frequency of the drivetrain, then the vibration is especially pronounced and is perceptible and measurable outside of the drivetrain. Although the vibration frequency is known in principle, and in principle the vibration can be extinguished by an antiphase actuation of the friction clutch using this frequency, it is very difficult to carry this out with the right phase and amplitude, since the physical clutch torque cannot easily be measured directly. The measured signal which is used as the indicator for the clutch torque in most cases has a very strong frequency dependency in amplitude and phase (cf. resonance throughput of a damped harmonic oscillator), which as a rule is not precisely known. The proposed method uses this approximately known dependency in order to obtain a stabilized control signal, in that the observed input signal oscillation, characterized by oscillation frequency, amplitude and phase, converts to time-dependent vibrating compensation clutch torques which are significantly more stable in phase and amplitude when the geometric flaw is constant. This makes it possible to realize a correction which reduces the vibration by means of a corresponding antiphase target torque modulation. By returning to a stable signal, even slow regulator concepts, such as I controllers can be used, which, in the ideal case, compensate for the vibration to the extent permitted by the control hardware.

BRIEF DESCRIPTION OF THE DRAWINGS

The nature and mode of operation of the present disclosure will now be more fully described in the following detailed description of the present disclosure taken with the accompanying figures, in which:

FIG. 1 is a block diagram of a method for reducing chatter vibrations of a friction clutch in a drivetrain of a motor vehicle.

DETAILED DESCRIPTION

The invention will be explained in further detail on the basis of the single FIGURE. This shows the block diagram 1 of the proposed method. The upper part of block diagram 1 shows the control system of a friction clutch, which is controlled automatically by a clutch actuator. To this end, the control unit outputs the target clutch torque M(target). In block 2, the control variable CV, for example an electric actuator voltage or the like, is determined from the clutch target value M(target) on the basis of a clutch characteristic curve. By means of the actuator mechanism depicted in block 3, a pre-control is performed, and then the present actual clutch torque M(actual) is distance-regulated. Block 4 depicts the dynamic reciprocal effects in the friction clutch and the surrounding drivetrain, which result in geometric chatter vibrations. The result is the subsequent vibration-marked clutch torque M(s) for example at a transmission input, for example on the transmission input shaft.

At the output of the friction clutch, for example on the transmission output shaft, at the branching 6 the input signal IS(A, φ) with amplitude A and phase φ, marked by oscillations due to the chatter vibrations, for example a speed of rotation marked by vibrations, is tapped off and fed to the correction module 5. Also fed to the correction module 5 is the guidance variable GV(n), for example the speed of rotation (n) of the internal combustion engine. From these variables, in a transfer function, from the input signal IS(A, φ), depending on amplitude and phase the phase-selective correction clutch torque M(correction) is determined, by means of which at branching 7 the target clutch torque M(target) is corrected phase-selectively. The correction module 8 can contain a similar or a different vibration-compensating algorithm, where an input signal IS(x) and at least one additional variable V can be fed in and a correction torque M(correction2) can be input into the branching 7. Additional modules corresponding to correction module 8 may be provided.

The lower part of block diagram 1 shows the correction module 5 of the upper part in detail. Here, the input signal IS(A, φ) and the guidance variable GV(n) are subjected to a Fourier analysis in block 9, where the guidance value serves as a reference value for estimating the frequency of the input signal IS(A, φ) and the amplitude A and phase φ of the input signal IS(A, φ) are ascertained. The guidance variable GV(n) may be, for example, the speed of rotation of the internal combustion engine, since geometric flaws in the clutch system may produce a non-uniformity in the clamping force of the clutch through an engine rotation. The guidance variable GV(n) as a guidance frequency signal may be used as the reference value for a Fourier analysis of the input signal IS(A, φ).

The Fourier analysis may take place continuously over the last oscillation period of the guidance frequency. The complex components (amplitude and phase) calculated from the Fourier analysis are now present in units of the input signal IS(A, φ). In block 10, the disturbance clutch torque M(disturbance) is derived from these variables on the basis of a transfer function, which reproduces the function of the friction clutch empirically or on the basis of models. In blocks 11, 12, the correction clutch torque is determined from the disturbance clutch torque M(disturbance) for example by inverting and regulating, for example by means of a corresponding inversion algorithm and an I controller, P controller and/or the like.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE LABELS 1 block diagram
2 block
3 block
4 block
5 correction module
6 branching
7 branching
8 correction module
9 block
10 block
11 block
12 block
A amplitude
IS(A, φ) input signal
IS(x) input signal
GV(n) guidance variable
V variable
M(actual) present actual clutch torque
M(correction) correction clutch torque
M(correction2) correction clutch torque
M(s) vibration-marked clutch torque
M(target) target clutch torque
M(disturbance) disturbance clutch torque
CV control variable
φ phase

The invention claimed is:

1. A method for reducing chatter vibrations of a friction clutch situated in a drivetrain of a motor vehicle between an internal combustion engine and a transmission, controlled automatically by a clutch actuator, on the basis of a target torque (M(target)) assigned to a clutch torque that is to be transmitted, having an actual present clutch torque (M(actual)) which is marked by vibrations as a result of occasionally occurring vibrations, comprising:

obtaining an absolute amplitude (A) and a phase (φ) of an input signal (IS(A, φ)), the input signal (IS(A, φ)) representative of vibration-marked clutch torque (M(v)) on the basis of a guidance variable (GV(n)) derived in a torque pattern between the internal combustion engine and the friction clutch;

determining, from the absolute amplitude (A) and the phase (φ) of the input signal (IS(A, φ)), a phase-selective disturbance clutch torque (M(disturbance)) by means of a transfer function that depicts a vibration-selective clutch torque;

determining, from the disturbance clutch torque (M(disturbance)), a phase-correct correction clutch torque (M(correction)); and correcting, using the phase-correct-correction clutch torque (M(correction)), the target clutch torque (M(target)).

2. The method according to claim 1, wherein the input signal IS(A, φ)) is a transmission input signal or a vehicle acceleration signal.

3. The method according to claim 1, wherein the guidance variable (GV(n)) is a rotation parameter of the internal combustion engine.

4. The method according to claim 1, further comprising: ascertaining a phase-selective amplitude (A) from a control variable (CV(n)).

5. The method according to claim 1, further comprising: using a control variable (CV(n)) as a reference variable for a Fourier analysis of the input signal (IS(A, φ)).

6. The method according to claim 1, further comprising: inverting the disturbance clutch torque (M(disturbance)) to obtain the correction clutch torque (M(correction)).

7. The method according to claim 1, further comprising: correcting the target clutch torque (M(target)) by means of a P controller using the correction clutch torque (M(correction)).

8. The method according to claim 1, further comprising: constantly correcting an amplitude of the correction clutch torque (M(correction)) by means of an I controller.

9. The method according to claim 1, further comprising: providing a correction of the clutch torque (M(v)) within prescribed amplitudes and/or phase shifts of the input signal (IS(A, φ)), of the disturbance clutch torque (M(disturbance)), the correction clutch torque (M(correction)) and/or the guidance variable (GV(n)).

10. The method according to claim 1, further comprising: providing, in a drivetrain having an electric motor supporting the internal combustion engine, phase-selective disturbance clutch torque (M(disturbance)) by means of the correction clutch torque (M(correction)), contributed by the electric motor.

* * * * *